G. W. Corson,
Making Laths.

No. 29,062. Patented July 10, 1860.

Witnesses
Geo Patten
Jas D Olney

Inventor
G. W. Corson

UNITED STATES PATENT OFFICE.

G. W. CORSON, OF CORSONS POST-OFFICE, PENNSYLVANIA.

MACHINE FOR SAWING BEVELS ON LATHS.

Specification of Letters Patent No. 29,062, dated July 10, 1860.

*To all whom it may concern:*

Be it known that I, G. W. CORSON, of Corsons Post-Office, in the county of Lycoming and State of Pennsylvania, have invented a new and useful Improvement in Lath-Machines; and I do hereby declare that the following is a full, clear, and exact description of the same, reference being had to the annexed drawing, forming part of this specification, in the several figures of which similar characters of reference denote the same part.

Figure 1:
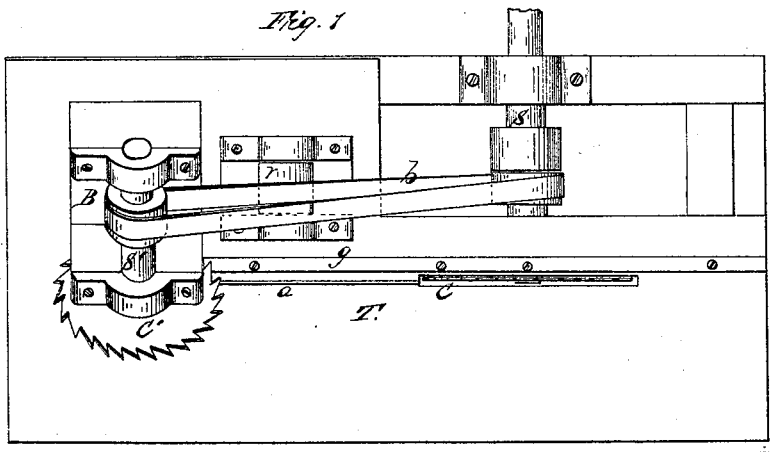
Figure 2:
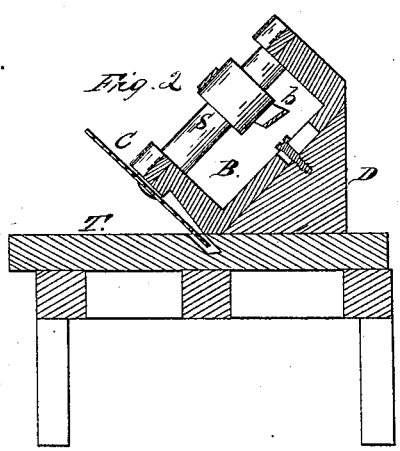

Figure 1 is a top view of my lath machine. Fig. 2 is a cross section on line $x$ $x$.

The object of this invention is the construction of a machine for sawing laths, and beveling their edges, and its nature consists in having a table or frame containing a circular saw turned by a crank shaft, by which the laths are sawed twice the width required, and the width is regulated by an adjustable guide piece which is attached to the table. At the other end of the table is a movable carriage elevated on an inclined frame to which it is fastened by screws through slots in it so as to allow it to be adjusted on the inclined block as desired. This carriage contains a shaft and another circular saw which is turned by a band passing around the pulley on its shaft and that on the other shaft, and by this inclined saw the laths are beveled at their edge.

In the drawing T, is the table S, the horizontal shaft, C, its circular saw, $g$, the adjustable guide piece on the table, T. $a$ is the fixed guide piece in the table; T, the adjustable carriage secured to the inclined block D; S', the shaft of carriage B, and C', its circular saw $b$, the band passing from shaft S, to S', and over guide roller R, between them, so that by adjusting the guide piece G, at twice the width required for the laths from the saw C, and the power being applied to shaft S, the two laths are sawed off, and are then moved up between fixed guide $a$, and the adjustable one $g$, to the inclined saw C', and it being turned by the same power by means of band $b$, passing from one to the other of the shafts, and the carriage B, being adjusted on the inclined block according to the required width of the lath the two are sawed apart obliquely across the center, thus making the edges beveled and allowing them to be fitted closely together.

I claim—

The combination of the oblique saw C', the adjustable carriage B, on inclined block D, with plane saw C adjustable guide piece $g$, shaft S, and band $b$, operating substantially as and for the purposes set forth.

In testimony whereof I have hereunto signed my name before two subscribing witnesses.

G. W. CORSON.

Witnesses:
GEO. PATTEN,
JOHN S. HOLLINGSHEAD.